United States Patent [19]
Osumi et al.

[11] 4,400,348
[45] Aug. 23, 1983

[54] ALLOY FOR OCCLUSION OF HYDROGEN

[75] Inventors: Yasuaki Osumi, Minoo; Hiroshi Suzuki, Ikeda; Akihiko Kato, Matsubara; Keisuke Oguro, Ikeda; Masanori Nakane, Ibaraki, all of Japan

[73] Assignees: Agency of Industrial Science & Technology; Ministry of International Trade & Industry, both of Tokyo, Japan

[21] Appl. No.: 222,351

[22] Filed: Jan. 5, 1981

[30] Foreign Application Priority Data

Jun. 3, 1980 [JP] Japan .................................. 55-75314

[51] Int. Cl.$^3$ ............................................. C22C 19/03
[52] U.S. Cl. ..................................... 420/443; 420/455; 420/580; 420/581; 420/588; 420/900; 423/644

[58] Field of Search ............. 75/170, 171, 122, 134 B, 75/134 F; 423/644

[56] References Cited

U.S. PATENT DOCUMENTS 4,222,770  9/1980  Osumi et al. .......................... 75/170

Primary Examiner—R. Dean
Attorney, Agent, or Firm—Kurt Kelman

[57] ABSTRACT

An alloy of the composition represented by the formula, $Mm_{1-x}Ca_xNi_{5-y}A_y$, wherein Mm stands for Mischmetal, A for one member selected from the group consisting of Al, Co, Cr, Fe, Mn, Si and Zn, x for a number within the range of 0.01 to 0.99 and y for a number within the range of 0.05 to 3 is useful for storage of hydrogen.

6 Claims, No Drawings

ALLOY FOR OCCLUSION OF HYDROGEN

BACKGROUND OF THE INVENTION

This invention relates to an alloy for the storage of hydrogen, and more particularly to a novel and useful Mischmetal calcium type multi-element alloy for the storage of hydrogen, which is capable of occluding a large volume of hydrogen in the form of a hydride and releasing the hydrogen readily and rapidly by application of a small amount of heat.

The term "Mischmetal" (hereinafter indicated simply as Mm) refers to an alloy which comprises 25 to 35% (by weight; hereinafter the same) of lanthanum, 40 to 50% of cerium, 4 to 15% of praseodymium, 4 to 15% of neodymium and 1 to 7% of samarium plus gadolinium and at least one element entrained by the raw material selected from the group consisting of 0.1 to 5% of iron, 0.1 to 1% of silicon, 0.1 to 2% of magnesium and 0.1 to 1% of aluminum.

As a new energy source to take the place of fossil fuels, hydrogen has recently come to attract increasing attention because of its salient advantage that it has promise of limitless supply, it is clean, it is transportable and its use as an energy source does not disturb natural cycles.

Heretofore, hydrogen has been stored in the form of gaseous hydrogen, liquefied hydrogen or metal hydride. Of the various forms of storage, the storage of hydrogen in the form of a metal hydride has recently come to attract particular attention. This is because alloys of a certain kind are capable of storing hydrogen with a density equal to or even greater than the density with which liquefied hydrogen is stored, and they are expected to enhance the efficiency of hydrogen storage. On the other hand, metal hydrides have come to be looked upon as energy conversion materials which serve to convert the chemical energy of hydrogen into thermal, mechanical or electrical energy.

The requirements which must be fulfilled by a substance to be used for storing hydrogen in the form of a metal hydride are (1) that the substance should be chemically stable and abundantly available from the standpoint of natural resources, (2) that it should be readily activated and should possess a high capacity for occlusion of hydrogen, (3) that it should possess the optimum equilibrium dissociation pressure and heat of formation suitable for the intended use, (4) that it should permit the reactions of occlusion and release of hydrogen to occur reversibly and each of these reactions to occur at a high rate of speed, (5) that it should be inexpensive and sufficiently available to promise feasibility, and so on. The transition metals such as Ti, Zr, La and Mg which have heretofore been known to produce hydrides have poor qualities for use as substances for storage of hydrogen because the hydrides of these metals are highly stable thermally and do not liberate hydrogen unless their temperatures are elevated to levels higher than 300° C., for example. In recent years, alloys of Ti-Ni, Ti-Co, Ti-Fe, La-Ni, Mg-Ni, Mm-Ni and Mm-Co have been developed. However, all have defects as substances for storage of hydrogen. Of the aforementioned alloys, those of Ti, La and Mg are as thermally stable as the metals Ti, La and Mg mentioned above or require a long time for effecting occlusion and release of hydrogen. The activation effected on these alloys can hardly be called easy. In the case that one of these alloys is used for the storage of hydrogen, the metals from which the alloys are produced must be of very high purity and, in this respect, there is an economic problem. Moreover since their capacities for occlusion of hydrogen are affected by the purity of the hydrogen, the hydrogen subjected to occlusion by the alloys is required to possess a high purity.

Comparison of the Mm-Ni and Mm-Co alloys reveals that while the former alloy possesses a high equilibrium dissociation pressure despite a large capacity for hydrogen occlusion, the latter alloy suffers from a small capacity for hydrogen occlusion despite a low equilibrium dissociation pressure. The activation of the Mm-Ni type alloy requires the hydrogen pressure to be as high as 80 to 90 kg/cm$^2$ or the treatment of activation to be performed for an excessively long period or to be repeated a number of times. This alloy consumes much time in occluding or releasing hydrogen.

As improvements over these alloys, there have been invented an alloy of the composition MmNi$_{5-x}$Co$_x$ (U.S. Pat. No. 4,147,536), an alloy of the composition MmNi$_{5-x}$A$_x$ (U.S. Pat. No. 4,222,770), and an alloy of the composition MmNi$_{5-x}$Cr$_{x-y}$A$_y$ (U.S. application Ser. No. 192,809, dated Oct. 1, 1980). The alloy of the general formula MmNi$_{5-x}$Co$_x$ approximate the Mm-Co alloy in equilibrium dissociation pressure and the Mm-Ni alloy in capacity for occlusion of hydrogen. The alloy of the general formula MmNi$_{5-x}$A$_x$, though superior to known alloys in properties such as speed of hydrogen occlusion, activation and equilibrium dissociation pressure which are essential for the occlusion of hydrogen, falls short of satisfying requirements for practical application. The alloy of the general formula MmNi$_{5-x}$Cr$_{x-y}$A$_y$ enjoys a peculiar feature never attained by the conventional alloys, i.e. the fact that it exhibits a constant dissociation pressure over a wide range of hydrogen/metal atom ratios, in other words, it possesses a small flatness factor.

Another alloy of the general formula Mm$_{1-x}$Ca$_x$Ni$_5$ (U.S. Pat. No. 4,096,639) enjoys a low cost of production but exhibits a high equilibrium dissociation pressure. It is thus difficult to use as a material for the occlusion of hydrogen.

As described above, alloys possessing properties suitable for the purpose of hydrogen occlusion have been developed in rapid succession. They have much room for improvement and have a common drawback that the cost of production is high.

In the circumstance, an alloy which is excellent in properties for the purpose of hydrogen occlusion, inexpensive to produce and fully feasible is in demand.

SUMMARY OF THE INVENTION

An object of this invention is to provide an alloy which possesses all the properties required for the purpose of hydrogen occlusion, which is abundantly available at a low cost and which promises high feasibility.

Basically, the alloy of this invention is a multi-element alloy containing Mischmetal and calcium to be obtained by substituting a prescribed proportion of the Mischmetal content of the MmNi$_5$ alloy with calcium and a prescribed proportion of the nickel content of the same alloy with a specified metal. Possessed of all the essential properties mentioned above, the usefulness of this alloy for the occlusion of hydrogen is incomparably high.

Specifically, this invention relates to a multi-component alloy containing Mischmetal and calcium, represented by the general formula: $Mm_{1-x}Ca_xNi_{5-y}A_y$ (wherein, Mm stands for Mischmetal, A for Al, Co, Cr, Fe, Mn, Si or Zn, x for a number within the range of from 0.01 to 0.99 and y for a number within the range of from 0.05 to 3). This alloy has the ability to occlude hydrogen.

DESCRIPTION OF THE PREFERRED EMBODIMENTS

The aforementioned Mischmetal-calcium type multi-element alloy of the present invention is a novel alloy developed for the first time by the inventors and it fulfills all the aforementioned requirements indispensable to the storage of hydrogen. It enjoys the advantage that it is inexpensive and capable of being readily activated, occluding a large volume of hydrogen in a high density and enabling the occluded hydrogen to be readily and quickly released by application of a moderate heat at normal room temperature or to slightly higher temperatures (on the order of 30° to 35° C., for example). Moreover, the ability of the alloy of this invention to occlude hydrogen is not affected at all by the purity of the hydrogen subjected to the occlusion. The alloy, therefore, permits efficient occlusion of hydrogen containing oxygen, nitrogen, argon, carbon dioxide, etc. in certain volumes.

In addition, the alloy of this invention enjoys an advantage that since its quality is unimpaired by the repetition of the cycle of hydrogen occlusion-release, it can retain its initial ability to occlude hydrogen for a long time.

The various outstanding properties mentioned above are especially conspicuous when the alloy contains Al, Co, Cr or Mn as the component "A" in the composition of the general formula $Mm_{1-x}Ca_xNi_{5-y}A_y$ indicated above. Such alloys manifest themselves to the best advantage when the value of "x" falls within the range of from 0.25 to 0.75 and that of "y" within the range of from 0.1 to 2.5. As is noted from Table 1, the alloy satisfying these conditions exhibits a very low dissociation pressure of hydride and serves ideally for the storage of hydrogen.

The Mischmetal to be used in the alloy of this invention generally comprises 25 to 35% (by weight; hereinafter the same) of lanthanum, 40 to 50% of cerium, 4 to 15% of praseodymium, 4 to 15% of neodymium and 1 to 7% of samarium+gadolinium and contains elements inevitably entrained by the raw materials. Generally, such entrained elements include 0.1 to 5% of iron, 0.1 to 1% of silicon, 0.1 to 2% of magnesium, 0.1 to 1% of aluminum, etc. Commercial products of Mischmetal are marketed today by Santoku Metal Industry, Shin-Nippon Metal Industry and Shinetsu Chemical Industry, for example.

As described above, the alloy of this invention for the storage of hydrogen has a composition represented by the general formula: $Mm_{1-x}Ca_xNi_{5-y}A_y$ (wherein Mm stands for Mischmetal, A for Al, Co, Cr, Fe, Mn, Si or Zn, x for a number within the range of from 0.01 to 0.99 and y for a number within the range of from 0.05 to 3). The value of "x" has been limited within the range of from 0.01 to 0.99 for the following reason. When the value of "x" does not reach 0.01, the properties of the produced alloy merely approximate those of the $MmNi_5$ alloy because they do not reflect the effect of the addition of Ca and the metal A (Al, Co, Cr, Fe, Mn, Si or Zn). The $MmNi_5$ alloy, because of its high dissociation pressure, has a disadvantage that its activation requires application of high pressure of hydrogen after thorough degasification or retention under an atmosphere of hydrogen at a low temperature, or both. When the value of "x" exceeds 0.99, while the ease of activation is secured, there ensues a disadvantage that liberation of the stored hydrogen necessitates elevation of temperature.

The value of "y" has been limited within the range of from 0.05 to 3 for the following reason. When the value of "y" does not reach 0.05, the properties of the produced alloy only approximate those of the $Mm_{1-x}Ca_xNi_5$ alloy because they do not reflect the effect of the addition of the metal A. For example, an alloy of the composition of $Mm_{0.5}Ca_{0.5}Ni_5$ entails a problem that it exhibits a fairly high dissociation pressure of hydride on the order of 3.5 to 12.3 atm. at room temperature. When the value of "y" exceeds 3, the produced alloy exhibits a very small capacity for occlusion of hydrogen and renders release of the stored hydrogen so difficult that the release is not effectively obtained unless the alloy is heated to a high temperature, occasionally, under a high degree of vacuum.

For the manufacture of the Mischmetal calcium type multi-element alloy represented by the aforementioned general formula of the present invention, although any of the various known methods can be used, the arc melting method is preferably adopted. To be specific, this alloy is readily obtained by mixing Mischmetal, calcium, nickel and the A component in amounts required to give a composition represented by the aforementioned general formula, each in a powdered form or in some other suitable form (generally in the form of rods), compression molding the resultant mixture in a desired shape, placing the shaped mixture in a known arc melting furnace, thermally fusing the mixture under an inert atmosphere and allowing the fused mixture to cool off. The Mischmetal calcium type multi-element alloy of the present invention obtained as described above is generally used advantageously in a powdered form which offers the merit of an increased surface area. The advantageous particle size for the powdered alloy is within the range of from 100 to 200 mesh.

The alloy can very easily be activated and the activated alloy provides easy and quick occlusion and release of a large amount of hydrogen. The activation of the alloy is accomplished by subjecting this alloy to just one cycle of hydrogen occlusion and release operations, or to two cycles of such operations in the case of certain alloy compositions. The operation for the occlusion of hydrogen or the formation of a hydride is effected by packing a suitable container with the aforementioned powdered alloy, sealing hydrogen in the system at normal room temperature and applying to the system a hydrogen pressure of about 50 kg/cm².

Particularly the alloy of the present invention has an advantage that this operation of hydrogen occlusion can be accomplished at normal room temperature within a very short period of several minutes. In contrast, the known Ti-Fe alloy causes substantially no occlusion of hydrogen under application of hydrogen pressure of 50 kg/cm² at normal room temperature and, therefore, cannot be activated by means of hydrogen occlusion. With this alloy, the occlusion of hydrogen necessitates an elevation of temperature to the level of about 400° to 500° C. and the activation of the alloy requires this operation of occlusion to be repeated a number of times. Similar conditions apply to the Ti-Ni, Ti-Co, La-Ni and Mg-Ni alloys. For the $MmNi_5$ alloy to be activated under the conditions of 50 kg/cm² of hydrogen pressure at normal room temperature, a similar operation of hydrogen occlusion must be repeated a number of times on the alloy.

After the aforementioned operation of hydrogen occlusion is completed, the system is evacuated. Consequently, the occluded hydrogen is readily released and the activation of the alloy is brought to completion.

Storage of hydrogen in the alloy which has been activated as described above is effected by filling an airtightly sealable container such as, for example, an ordinary gas cylinder with the alloy and applying to the contained alloy a prescribed hydrogen pressure (a hydrogen pressure slightly higher than the dissociation pressure of the hydride of alloy in use) at a temperature within the range of from −30° C. to normal room temperature. Consequently, the alloy occludes a large amount of hydrogen in the form of a hydride in a short period of time.

Now, the notable reduction in dissociation pressure which is attained in the alloy of the present invention will be described. Substitution of a part of the Ni content of the MmNi$_5$ alloy with Cr gives an alloy of the general formula MmNi$_{5-y}$Cr$_y$ disclosed in U.S. Pat. No. 4,222,770, and further substitution of a part of the Mm content of the latter alloy with Ca gives the Mm$_{1-x}$Ca$_x$Ni$_{5-y}$Cr$_y$ of the present invention. Comparison of the dissociation pressures of these alloys will be described more fully afterwards. Under fixed conditions, the dissociation pressures decrease in the order of the alloys mentioned above. The alloy of the present invention thus exhibits the lowest dissociation pressure.

Release of hydrogen from the hydride can be effected by simply opening the container at normal room temperature. For more efficient, quicker release of hydrogen, the alloy with the occluded hydrogen is desired to be subjected to application of heat to a temperature higher than normal room temperature or to vacuumization of the ambience, preferably to both these treatments. These operations of occlusion and release of hydrogen into and out of the activated alloy of the present invention can be carried out very easily compared with those involved in the case of the conventional alloys such as Ti-Fe, Ti-Ni, La-Ni and Mm-Ni alloys. Specifically, these operations can be performed efficiently more than three times as quickly as with these conventional alloys.

The speed at which the alloy of this invention releases the stored hydrogen is nearly the same as that of the alloy of the aforementioned U.S. application Ser. No. 192,809 and is notably high as compared with that of the alloy of U.S. Pat. No. 4,147,536 or the alloy of U.S. Pat. No. 4,222,770.

Further, the alloy of the present invention enables the aforementioned occlusion and release of hydrogen in a perfectly reversible manner. Substantially no degradation is observed to occur in the alloy itself no matter how often the formation of the hydride and the decomposition thereof may be repeated. This means that the alloy can be used for a very long period of time. The impurities such as oxygen, nitrogen, argon and carbon dioxide which are possibly present in the occluded hydrogen are observed to have substantially no effect upon the alloy.

Moreover, the alloy of this invention uses Ca, an inexpensive substance, in the place of a part of Mm and, therefore, has a very low production cost as compared with the various conventional alloys containing Mischmetal. Further, since the alloy of the present invention can occlude a large volume of hydrogen by a simple operation and can release the stored hydrogen easily and rapidly, it proves to be a highly practicable, very useful alloy for the storage of hydrogen.

Now, this invention will be described more specifically below with reference to working examples and a comparative example.

EXAMPLE 1

Mm, Ca, Ni and A components were mixed in amounts calculated to give the alloy compositions shown in Table 1 below to prepare rods (5 mm in diameter and 5 mm in length) or powders. Then, these mixtures were compression molded to produce cylindrical tablets. These tablets were placed in a copper crucible of a high-vacuum arc melting furnace and, with the furnace interior displaced with an atmosphere of high-purity argon, melted at an elevated temperature of about 2000° C. and then left to cool off to afford an alloy of the composition shown in Table 1. The alloy thus obtained was pulverized to 120 mesh, and a 5.0-g specimen of the pulverized alloy was placed in a stainless steel reactor for occlusion and release of hydrogen and was activated as indicated below. The reactor was connected to an evacuation unit and subjected to a degasifying treatment at 200° C. under a vacuum. Subsequently at normal room temperature, hydrogen pure to 99.9999% was introduced into the reactor. When the hydrogen pressure within the reactor was kept at 50 kg/cm², the alloy was observed immediately to start occluding hydrogen. After the operation of hydrogen occlusion was completed, the reactor was again evacuated until the release of the occluded hydrogen was completed. The alloy which had been activated by one or two cycles of the aforementioned occlusion-release treatments was made to occlude hydrogen of purity of 99.9999% at a pressure slightly higher than the dissociation pressure of the hydride of the alloy at normal room temperature (30° C.) to effect sealed storage of hydrogen.

The properties of hydrogen occlusion exhibited by the alloys of this invention, namely the amounts of hydrogen occluded, the dissociation pressures of the corresponding hydrides, the numbers of cycles of activation, the speeds of hydrogen occlusion, etc. obtained as described above are shown in Table 1. For the purpose of comparison, Table 1 also shows the properties of hydrogen occlusion determined of known Mm type alloys prepared similarly, namely the MmNi$_5$ alloy and the Mm$_{1-x}$Ca$_x$Ni$_5$ alloy of U.S. Pat. No. 4,096,639.

TABLE 1

| Specimen No. | Alloy composition Mm$_{1-x}$Ca$_x$Ni$_{5-y}$A$_y$ | Amount of hydrogen occluded (% by wt) | Dissociation pressure of hydride at 30° C. (atm) | Number of cycles of activation | Speed of hydrogen occlusion (ml/g.min) | Time for saturation of hydrogen occlusion at room temperature (min) |
|---|---|---|---|---|---|---|
| 1 | MmNi$_5$ | 1.5 | 14.0 | 6 | 40 | |
| 2 | Mm$_{0.95}$Ca$_{0.05}$Ni$_{4.5}$Al$_{0.5}$ | 1.6 | 2.5 | 1 | 165 | |
| 3 | Mm$_{0.5}$Ca$_{0.5}$Ni$_{4.5}$Al$_{0.5}$ | 1.3 | 2.0 | 1 | 160 | |

TABLE 1-continued

| Specimen No. | Alloy composition $Mm_{1-x}Ca_xNi_{5-y}A_y$ | Amount of hydrogen occluded (% by wt) | Dissociation pressure of hydride at 30° C. (atm) | Number of cycles of activation | Speed of hydrogen occlusion (ml/g.min) | Time for saturation of hydrogen occlusion at room temperature (min) |
|---|---|---|---|---|---|---|
| 4 | $Mm_{0.25}Ca_{0.75}Ni_{4.5}Al_{0.5}$ | 1.4 | 1.5 | 2 | 155 | |
| 5 | $Mm_{0.5}Ca_{0.5}Ni_{4.95}Al_{0.05}$ | 1.3 | 7.7 | 2 | 155 | |
| 6 | $Mm_{0.5}Ca_{0.5}Ni_{4.0}Al_{1.0}$ | 1.3 | 2.0 | 1 | 160 | |
| 7 | $Mm_{0.95}Ca_{0.05}Ni_{2.5}Co_{2.5}$ | 1.2 | 3.0 | 1 | 160 | |
| 8 | $Mm_{0.5}Ca_{0.5}Ni_{2.5}Co_{2.5}$ | 1.1 | 2.8 | 1 | 155 | 5–6 |
| 9 | $Mm_{0.25}Ca_{0.75}Ni_{2.5}Co_{2.5}$ | 1.1 | 1.5 | 2 | 150 | 5–6 |
| 10 | $Mm_{0.5}Ca_{0.5}Ni_{4.95}Co_{0.05}$ | 1.3 | 8.0 | 2 | 150 | |
| 11 | $Mm_{0.5}Ca_{0.5}Ni_{2.0}Co_{3.0}$ | 1.1 | 1.5 | 1 | 150 | |
| 12 | $Mm_{0.95}Ca_{0.05}Ni_{4.5}Cr_{0.5}$ | 1.6 | 5.0 | 1 | 165 | |
| 13 | $Mm_{0.5}Ca_{0.5}Ni_{4.5}Cr_{0.5}$ | 1.1 | 4.8 | 1 | 160 | 5–6 |
| 14 | $Mm_{0.25}Ca_{0.75}Ni_{4.5}Cr_{0.5}$ | 1.1 | 4.5 | 2 | 155 | 5–6 |
| 15 | $Mm_{0.5}Ca_{0.5}Ni_{4.95}Cr_{0.05}$ | 1.4 | 7.8 | 2 | 155 | |
| 16 | $Mm_{0.5}Ca_{0.5}Ni_{4.0}Cr_{1.0}$ | 1.3 | 4.0 | 1 | 160 | |
| 17 | $Mm_{0.95}Ca_{0.05}Ni_{4.0}Fe_{1.0}$ | 1.5 | 6.0 | 1 | 165 | |
| 18 | $Mm_{0.5}Ca_{0.5}Ni_{4.0}Fe_{1.0}$ | 1.3 | 5.0 | 1 | 160 | |
| 19 | $Mm_{0.25}Ca_{0.75}Ni_{4.0}Fe_{1.0}$ | 1.3 | 4.2 | 2 | 155 | |
| 20 | $Mm_{0.5}Ca_{0.5}Ni_{4.95}Fe_{0.05}$ | 1.4 | 7.5 | 2 | 155 | |
| 21 | $Mm_{0.5}Ca_{0.5}Ni_{3.0}Fe_{2.0}$ | 1.2 | 1.5 | 2 | 150 | |
| 22 | $Mm_{0.95}Ca_{0.05}Ni_{4.5}Mn_{0.5}$ | 1.5 | 3.2 | 1 | 165 | |
| 23 | $Mm_{0.5}Ca_{0.5}Ni_{4.5}Mn_{0.5}$ | 1.1 | 2.0 | 1 | 160 | |
| 24 | $Mm_{0.25}Ca_{0.75}Ni_{4.5}Mn_{0.5}$ | 1.1 | 1.5 | 2 | 155 | |
| 25 | $Mm_{0.5}Ca_{0.5}Ni_{4.95}Mn_{0.05}$ | 1.1 | 7.5 | 2 | 155 | |
| 26 | $Mm_{0.5}Ca_{0.5}Ni_{4.0}Mn_{1.0}$ | 1.1 | 1.5 | 1 | 160 | |
| 27 | $Mm_{0.95}Ca_{0.05}Ni_{4.5}Si_{0.5}$ | 1.5 | 7.0 | 1 | 165 | |
| 28 | $Mm_{0.5}Ca_{0.5}Ni_{4.5}Si_{0.5}$ | 1.4 | 4.5 | 1 | 160 | 5–6 |
| 29 | $Mm_{0.25}Ca_{0.75}Ni_{4.5}Si_{0.5}$ | 1.3 | 4.0 | 2 | 155 | 5–6 |
| 30 | $Mm_{0.5}Ca_{0.5}Ni_{4.95}Si_{0.05}$ | 1.4 | 7.8 | 2 | 155 | |
| 31 | $Mm_{0.5}Ca_{0.5}Ni_{4.0}Si_{1.0}$ | 1.3 | 1.5 | 1 | 160 | |
| 32 | $Mm_{0.95}Ca_{0.05}Ni_{4.5}Zn_{0.5}$ | 1.5 | 4.6 | 1 | 165 | |
| 33 | $Mm_{0.5}Ca_{0.5}Ni_{4.5}Zn_{0.5}$ | 1.4 | 3.0 | 1 | 160 | |
| 34 | $Mm_{0.25}Ca_{0.75}Ni_{4.5}Zn_{0.5}$ | 1.3 | 2.5 | 2 | 150 | |
| 35 | $Mm_{0.5}Ca_{0.5}Ni_{4.95}Zn_{0.05}$ | 1.4 | 7.5 | 2 | 150 | |
| 36 | $Mm_{0.5}Ca_{0.5}Ni_{4.0}Zn_{1.0}$ | 1.3 | 7.0 | 1 | 160 | |
| 37 | *$Mm_{0.8}Ca_{0.2}Ni_5$ | — | 13.0–15.4 | — | — | |
| 38 | *$Mm_{0.5}Ca_{0.5}Ni_5$ | — | 3.5–12.3 | — | — | |
| 39 | *$Mm_{0.3}Ca_{0.7}Ni_5$ | — | 1.4–6.2 | — | — | |

*The data in the indicated blocks are cited from the specification of U.S. Pat. No. 4,096,639.

It is seen from Table 1 that the Mischmetal calcium type alloy of the present invention, at room temperature, occluded hydrogen of an amount equal to or greater than the $MmNi_5$ (Specimen No. 1) alloy, attained activation with ⅓ to 1/6 of the number of activation treatments required by the $MmNi_5$ alloy, and effected the occlusion of hydrogen at a speed four times as fast as the $MmNi_5$ alloy. The release of the hydrogen from the hydride of the alloy of this invention could easily be accomplished by leaving the reactor at normal temperature or heating it to a temperature slightly higher than the normal room temperature or by exposing the interior of the reactor to a vacuum or by subjecting the alloy to both the treatments. The speed at which the release of hydrogen occurred was as high as the speed at which the occlusion of hydrogen occurred.

The fact that the dissociation pressures of hydrides at 30° C. were of quite proper values as noted from Table 1 indicates that the alloys provided by the present invention serve particularly advantageously as alloys for storage of hydrogen through occlusion.

EXAMPLE 2

By following the procedure of Example 1, alloys of compositions represented by the general formula, $Mm_{1-x}Ca_xNi_{5-y}A_y$ (wherein Mm stands for Mischmetal, A for Al, Co, Cr, Fe, Mn, Si or Zn, x for a number within the range of from 0.01 to 0.99 and y for a number within the range of from 0.05 to 3) were prepared and subsequently were activated with 99.5% hydrogen. This activation was effected by subjecting the alloys to one or two cycles of occlusion and release of hydrogen. Then, the activated alloys were exposed to hydrogen pressures slightly higher than the dissociation pressures of the corresponding hydrides at room temperature (30° C.) to occlude hydrogen of a purity of 99.5%. The hydrogen occlusion properties such as the amounts of hydrogen occluded, the dissociation pressures of the corresponding hydrides, the numbers of cycles of activation and the speeds of hydrogen occlusion exhibited by the alloys of this invention (those of Specimen Nos. 2–36) were substantially the same as those obtained in Example 1. The release of hydrogen from the hydrides was effected as easily and quickly as in Example 1. The results are shown in Table 2 below.

TABLE 2

| Specimen No. | Alloy composition | Amount of hydrogen occluded (% by wt) | Dissociation pressure of hydride at 30° C. (atm) | Number of cycles of activation | Speed of hydrogen occlusion (ml/g.min) | Time for saturation of hydrogen occlusion at room temperature (min) |
|---|---|---|---|---|---|---|
| 1 | $Mm_{0.5}Ca_{0.5}Ni_{4.5}Al_{0.5}$ | 1.3 | 2.0 | 1 | 160 | about 6 |

TABLE 2-continued

| Specimen No. | Alloy composition | Amount of hydrogen occluded (% by wt) | Dissociation pressure of hydride at 30° C. (atm) | Number of cycles of activation | Speed of hydrogen occlusion (ml/g.min) | Time for saturation of hydrogen occlusion at room temperature (min) |
|---|---|---|---|---|---|---|
| 2 | $Mm_{0.5}Ca_{0.5}Ni_{2.5}Co_{2.5}$ | 1.1 | 2.8 | 1 | 155 | " |
| 3 | $Mm_{0.5}Ca_{0.5}Ni_{4.5}Cr_{0.5}$ | 1.1 | 4.8 | 1 | 160 | " |
| 4 | $Mm_{0.5}Ca_{0.5}Ni_{4.0}Fe_{1.0}$ | 1.3 | 5.0 | 1 | 160 | " |
| 5 | $Mm_{0.5}Ca_{0.5}Ni_{4.5}Mn_{0.5}$ | 1.1 | 2.0 | 1 | 160 | " |
| 6 | $Mm_{0.5}Ca_{0.5}Ni_{4.5}Si_{0.5}$ | 1.4 | 4.5 | 1 | 160 | " |
| 7 | $Mm_{0.5}Ca_{0.5}Ni_{4.5}Zn_{0.5}$ | 1.4 | 3.0 | 1 | 160 | " |
| * | $Mm_{0.5}Ca_{0.5}Ni_5$ | — | 3.5–12.3 | — | — | about 60 |

*The data in the indicated block is cited from the specification of U.S. Pat. No. 4,096,639.

COMPARATIVE EXAMPLE

By following the procedure of Example 1, alloys of the compositions, $MmNi_{5-x}Co_x$ of U.S. Pat. No. 4,147,536, $MmNi_{5-x}A_x$ of U.S. Pat. No. 4,222,770 and $MmNi_{5-x}Cr_{x-y}A_y$ of U.S. application Ser. No. 192,809 and alloys of the conventional compositions, $MmNi_5$ and $LaNi_5$, were prepared as shown in Table 3. The hydrogen occlusion properties such as the amounts of hydrogen occluded, the dissociation pressures of the corresponding hydrides at 30° C. and the speeds of hydrogen occlusion were determined of these alloys. The results are shown in conjunction with alloy costs in Table 3. For the purpose of comparison, the data obtained of the alloy of the composition, $Mm_{1-x}Ca_xNi_5$ of U.S. Pat. No. 4,096,639, and some of the data of Table 1 are shown in the same table together with their alloy costs.

Pat. No. 4,096,639. The time for saturation of hydrogen occlusion at room temperature required of the alloys of this invention is about 1/10 of the time required of the alloys of the aforementioned U.S. patent. Besides, the alloys of this invention enjoy a notable characteristic that they are not affected by the purity of hydrogen subjected to occlusion.

It is, thus, apparent that the alloys of this invention have the highest economic practicality.

What is claimed is:

1. A quaternary alloy for storage of hydrogen, exhibiting low dissociation pressure of hydride and high speed of hydrogen release, and having a composition represented by the general formula:

$$Mm_{1-x}Ca_xNi_{5-y}A_y$$

wherein, Mm stands for Mischmetal, A for one member

TABLE 3

| | Specimen No. | Alloy composition | Amount of hydrogen occluded (% by wt) | Dissociation pressure of hydride at 30° C. (atm) | Number of cycle of activation | Speed of hydrogen occlusion (ml/g.min) | Speed of hydrogen releasing (ml/g.min) | Alloy cost ($/kg) |
|---|---|---|---|---|---|---|---|---|
| | 1 | $MmNi_5$ | 1.5 | 14.0 | 6 | 40 | 81 | 7.5 |
| U.S. Pat. No. 4,147,536 | 2 | $MmNi_{2.5}Co_{2.5}$ | 1.2 | 3.3(20° C.) | 2 | 160 | 150 | 12.0 |
| U.S. Pat. No. 4,222,770 | 3 | $MmNi_{4.5}Cr_{0.5}$ | 1.6 | 5.0 | 1 | 165 | 165 | 10.5 |
| | 4 | $MmNi_{4.0}Fe_{1.0}$ | 1.5 | 6.0 | 1 | 165 | 162 | 10.0 |
| | 5 | $MmNi_{4.5}Si_{0.5}$ | 1.5 | 7.0 | 1 | 185 | 155 | 10.0 |
| | 6 | $MmNi_{4.5}Zn_{0.5}$ | 1.5 | 4.6 | 1 | 165 | 160 | 10.5 |
| U.S. appln. 192,809 | 7 | $MmNi_{4.5}Cr_{0.25}Co_{0.25}$ | 1.6 | 3.0 | 1 | 165 | 245 | 12.0 |
| | 8 | $MmNi_{4.5}Cr_{0.25}Fe_{0.25}$ | 1.5 | 5.0 | 2 | 165 | 245 | 10.0 |
| | 9 | $MmNi_{4.5}Cr_{0.25}Si_{0.25}$ | 1.6 | 1.5 | 1 | 165 | 260 | 10.0 |
| Present invention | 10 | $Mm_{0.5}Ca_{0.5}Ni_{2.5}Co_{2.5}$ | 1.1 | 2.8 | 1 | 155 | 245 | 5.3 |
| | 11 | $Mm_{0.25}Ca_{0.75}Ni_{2.5}Co_{2.5}$ | 1.1 | 1.5 | 2 | 150 | 240 | 5.3 |
| | 12 | $Mm_{0.5}Ca_{0.5}Ni_{4.5}Cr_{0.5}$ | 1.1 | 4.8 | 1 | 160 | 250 | 5.2 |
| | 13 | $Mm_{0.25}Ca_{0.75}Ni_{4.5}Cr_{0.5}$ | 1.1 | 4.5 | 2 | 155 | 255 | 5.2 |
| | 14 | $Mm_{0.5}Ca_{0.5}Ni_{4.0}Fe_{1.0}$ | 1.3 | 5.0 | 1 | 160 | 245 | 5.0 |
| | 15 | $Mm_{0.25}Ca_{0.75}Ni_{4.0}Fe_{1.0}$ | 1.3 | 4.2 | 2 | 155 | 240 | 5.0 |
| | 16 | $Mm_{0.5}Ca_{0.5}Ni_{4.5}Si_{0.5}$ | 1.4 | 4.5 | 1 | 160 | 260 | 5.0 |
| | 17 | $Mm_{0.25}Ca_{0.75}Ni_{4.5}Si_{0.5}$ | 1.3 | 4.0 | 2 | 155 | 250 | 5.0 |
| | 18 | $LaNi_5$ | 1.4 | 2.5 | 3 | 160 | 160 | 20.0 |
| U.S. Pat. No. 4,096,639 | 19 | $Mm_{0.8}Ca_{0.2}Ni_5$ | — | 13.0–15.4 | — | — | — | — |
| | 20 | $Mm_{0.5}Ca_{0.5}Ni_5$ | — | 3.5–12.3 | — | — | — | — |
| | 21 | $Mm_{0.3}Ca_{0.7}Ni_5$ | — | 1.4–6.2 | — | — | — | 5.3 |

Comparison of the data given above reveals that the alloys of the present invention excel those of $MmNi_5$ in dissociation pressure of hydride, number of cycles of activation, speed of hydrogen occlusion, speed of hydrogen release and cost; those of the conventional $LaNi_5$ in speed of hydrogen release and cost; those of U.S. Pat. No. 4,147,536 in speed of hydrogen release and cost; those of U.S. Pat. No. 4,222,770 in dissociation pressure of hydride, speed of hydrogen release and cost; and those of U.S. application Ser. No. 192,809 in cost.

Further in point of dissociation pressure of hydride, the alloys of the present invention excel those of U.S.

selected from the group consisting of Al, Co, Cr, Fe, Mn, Si and Zn, x for a number within the range of from 0.01 to 0.99 and y for a number within the range of from 0.05 to 3.

2. The alloy according to claim 1, wherein the Mischmetal comprises 25 to 35% by weight of La, 40 to 50% by weight of Ce, 4 to 15% by weight of Pr, 4 to 15% by weight of Nd and 1 to 7% by weight of Sm plus Gd and one or more elements accompanying the raw materials for the elements mentioned above.

3. The alloy according to claim 2, wherein the one or more elements accompanying the raw materials are at least one member selected from the group consisting of 0.1 to 5% by weight of Fe, 0.1 to 1% by weight of Si, 0.1 to 2% by weight of Mg and 0.1 to 1% by weight of Al.

4. The alloy according to claim 1, wherein the component A of the composition is one member selected from the group consisting of Al, Co, Cr and Mn.

5. The alloy according to claim 1 or claim 4, wherein the value of x is within the range of from 0.25 to 0.75.

6. The alloy according to claim 1 or claim 4 wherein the value of y is within the range of from 0.1 to 2.5.

* * * * *